United States Patent
Sharp et al.

(10) Patent No.: US 9,046,755 B2
(45) Date of Patent: Jun. 2, 2015

(54) HIGH ELASTIC MODULUS PROJECTION SCREEN SUBSTRATES

(71) Applicant: RealD Inc., Beverly Hills, CA (US)

(72) Inventors: Gary D. Sharp, Boulder, CO (US); Kevin R. Curtis, Boulder, CO (US); David A. Coleman, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/020,654

(22) Filed: Sep. 6, 2013

(65) Prior Publication Data

US 2014/0063600 A1  Mar. 6, 2014

Related U.S. Application Data

(60) Provisional application No. 61/697,692, filed on Sep. 6, 2012.

(51) Int. Cl.
*G03B 21/56* (2006.01)
*G03B 21/60* (2014.01)
*G03B 21/606* (2014.01)

(52) U.S. Cl.
CPC .............. *G03B 21/562* (2013.01); *G03B 21/56* (2013.01); *G03B 21/606* (2013.01)

(58) Field of Classification Search
CPC ..... G03B 21/562; G03B 21/58; G03B 21/606
USPC .......................................... 359/443, 461, 446
See application file for complete search history.

(56) References Cited

U.S. PATENT DOCUMENTS

| | | | |
|---|---|---|---|
| 3,720,455 A * | 3/1973 | Sahlin | 359/461 |
| 6,408,930 B1 | 6/2002 | von Wyl et al. | |
| 7,688,506 B2 * | 3/2010 | Sugawara et al. | 359/446 |
| 7,872,802 B2 * | 1/2011 | Seymour | 359/461 |
| 7,880,965 B2 * | 2/2011 | Michimori et al. | 359/446 |
| 7,961,388 B1 * | 6/2011 | Deutsch et al. | 359/443 |
| 8,169,697 B2 * | 5/2012 | Katsuma | 359/443 |
| 2007/0035826 A1 | 2/2007 | Yokoyama et al. | |
| 2007/0153379 A1 * | 7/2007 | Mikkelsen et al. | 359/461 |

(Continued)

FOREIGN PATENT DOCUMENTS

EP     1260850 B1    11/2005

OTHER PUBLICATIONS

Life Sciences Polymer Materials;Cyclic Olefin Copolymer/Cyclic Olefin Polymer, CIDRA Precision Services, LLC, 2012 printed from http://www.cidraprecisionservices.com/life-sciences-materials-polymer-materials-coc-cop.html.*

(Continued)

*Primary Examiner* — Christopher Mahoney
(74) *Attorney, Agent, or Firm* — Darlene K. Kondo; Neil G. Mothew

(57) ABSTRACT

A stiffening strip at selected edges of a screen may enable the use and mounting of a high-elastic modulus substrate screen material. Such screen materials may be engineered to provide polarization-preserving characteristics, and be applied to or part of the high-elastic modulus substrate. Furthermore, the stiffening strip may enable the use of screen vibration techniques to reduce speckle in display applications that use projection screens, particularly those display applications using illumination sources prone to speckle such as laser-based projection. The screen vibration may be provided by a vibrating device attached to the stiffening strip.

18 Claims, 9 Drawing Sheets

(56) References Cited

U.S. PATENT DOCUMENTS

| | | | |
|---|---|---|---|
| 2008/0037117 A1* | 2/2008 | Seki et al. | 359/446 |
| 2010/0020395 A1* | 1/2010 | Watanabe et al. | 359/446 |
| 2010/0053746 A1 | 3/2010 | Seymour | |
| 2011/0222150 A1 | 9/2011 | Katsuma | |
| 2011/0249329 A1* | 10/2011 | Kinoshita et al. | 359/446 |
| 2011/0261450 A1 | 10/2011 | Howes et al. | |
| 2012/0250150 A1* | 10/2012 | Katsenelenson et al. | 359/449 |
| 2012/0314284 A1* | 12/2012 | Howes et al. | 359/443 |

OTHER PUBLICATIONS

International Search Report, PCT/US2013/058624, dated Dec. 12, 2013.

Gollier, J., "Speckle measurement procedure", Corning Incorporated; May 7, 2010, 16 pages.

Roelandt et al.; "Standardized speckle measurement method matched to human speckle perception in laser projection systems", Optics Express, 20:8, Apr. 2, 2012.

* cited by examiner

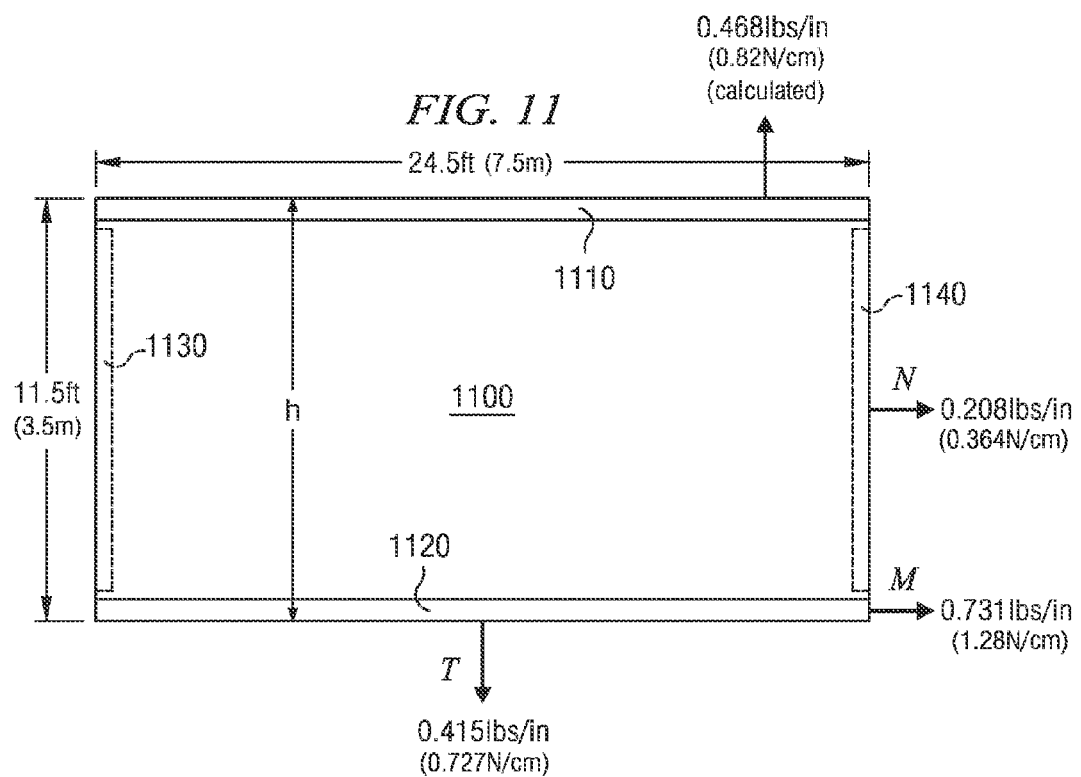
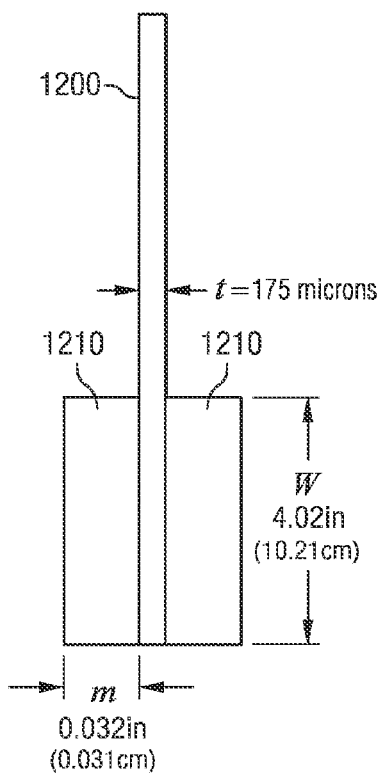
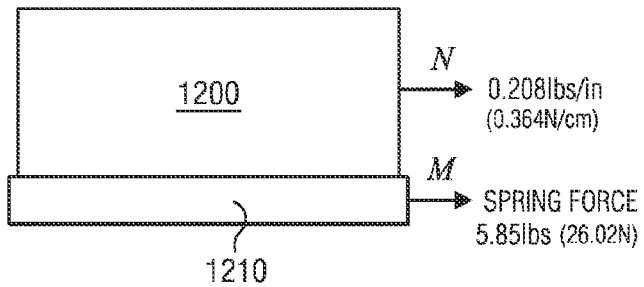

HIGH ELASTIC MODULUS PROJECTION SCREEN SUBSTRATES

CROSS-REFERENCE TO RELATED APPLICATIONS

This application claims priority to U.S. Patent App. No. 61/697,692, entitled "Mechanical design and optical benefits of high elastic modulus cinema screen substrates", filed Sep. 6, 2012, the entirety of which is herein incorporated by reference.

TECHNICAL FIELD

The present disclosure generally relates to electrophotographic arts, and more specifically, to two dimensional and three dimensional projection screen mounting technologies and components.

BACKGROUND

Generally, current projection and display technologies may include functionality to deploy, view and/or display three dimensional ("3D") content. Recently, the increased demand for such functionality has driven the need for enhanced performance and development of projection and display technology. The choice of cinema projection screen substrate has evolved over time to facilitate easy shipping and installation. The current best solution for matte white screens is a highly flexible plasticized PVC substrate that is tolerant of relatively crude installation techniques. However, as the optical functionality requirements for the screen surface have increased, the need for a more mechanically functional substrate has also increased.

SUMMARY

As the optical functionality requirements for the screen surface have increased, the need for a more mechanically functional substrate for the screen has also increased. The use of directional (gain) diffusers and mechanical vibration both benefit from a more mechanically rigid substrate.

Typical movie projection screens may use a polymer substrate, usually poly-vinyl-chloride (PVC), roll stock that is perforated for acoustic transmission and then seamed together to screen size. These screens are typically 0.2-0.6 mm thick, heavily plasticized, and embossed with a matte texture. One technique for producing a polarization preserving screen involves spraying the screen with a polarization preserving coating. A conventional polarization preserving coating may have a metal flake, for example, ball-milled aluminum powder, encased in a polymer binder. These screens are relatively heavy and have a low elastic modulus, making high frequency vibration, for example approximately 100 Hz, for speckle reduction very challenging. In one embodiment, the present disclosure provides a substrate and mechanical configuration to produce a screen that provides efficient high frequency vibration at the periphery to reduce speckle in projection.

Generally, one embodiment of the present disclosure may take the form of a method for managing strain primarily induced by a non-uniform load on a screen. This method may include using a high-elastic modulus substrate for the screen and fastening a stiffening strip proximate to at least two edges of the high-elastic modulus substrate. The stiffening strip may substantially distribute the load on the screen. The method may also include attaching at least one mechanical vibration device proximate to the stiffening strip. In one example, the at least one mechanical vibration device may be a transducer and also may be a number of other devices as discussed herein. The method may also include vibrating the screen using the at least one transducer so that less than an approximately ten percent light intensity variation results. The frequency range of the at least one transducer may be approximately 2-500 Hz.

Another embodiment of the present disclosure may take the form of a projection screen operable to be mounted under a non-uniform load. The projection screen may include a high-elastic modulus substrate and a stiffening strip proximate to at least two edges of the high-elastic modulus substrate, wherein the stiffening strip may result in a substantially uniform optical appearance of the projection screen. The high-elastic modulus substrate may be any appropriate substrate including one of a polycarbonate (PC) substrate or a Polyethylene terephthalate (PET) substrate. The stiffening strip may be located at least at the top and bottom of the projection screen, but may also be located on the sides of the screen as well. Additionally, the stiffening strip and the high-elastic modulus substrate of the projection screen may be the same material.

Continuing this embodiment, a non-uniform load may be induced on the projection screen and spring connection points may be used to generate localized loads. The coefficient of thermal expansion of the stiffening strip may be substantially the same as the high-elastic modulus substrate. Further, the stiffening strip may be attached to the high-elastic modulus substrate surface using one of a pressure sensitive adhesive or a UV glue. The stiffening strip also may be attached to the screen using any of the methods discussed herein. The stiffening strip may be attached to both the front surface and the back surface of the high-elastic modulus substrate to place the high-elastic modulus substrate under an approximately neutral mechanical load when the projection screen is rolled. The projection screen may also include at least one vibration device located proximate to the stiffening strip and the vibration device may be a transducer. The at least one transducer may be operable to vibrate the high-elastic modulus substrate while maintaining less than approximately ten percent intensity variation across the projection screen.

Another embodiment of the present disclosure may take the form of a projection screen. The projection screen may include a high-elastic modulus substrate and at least one vibration device proximate to the high-elastic modulus substrate. The at least one vibration device may be a transducer which may be operable to vibrate the high-elastic modulus substrate while maintaining less than approximately ten percent intensity variation across the screen. The projection screen may include a mounting strip proximate to at least two edges of the projection screen and the mounting strip may be a high-elastic modulus material. The high-elastic modulus substrate and the mounting strip may be the same material. The vibration device may be mounted to the mounting strip in at least one location. Additionally, the vibration generated by the vibration device may be sufficient to reduce the speckle contrast to less than approximately 15 percent speckle contrast.

Generally, another embodiment of the present disclosure may take the form of a method for reducing speckle in displays. The method may include enabling the use of a high-elastic modulus substrate by fastening a mounting strip proximate to the edges of the substrate and allowing vibration to propagate through the high-elastic modulus substrate by using a mechanical vibrating device proximate to the mounting strip.

BRIEF DESCRIPTION OF THE DRAWINGS

Embodiments are illustrated by way of example in the accompanying figures, in which like reference numbers indicate similar parts, and in which:

FIG. 11 is a schematic diagram of one embodiment of the present disclosure, showing an exemplary load on a screen, in accordance with the present disclosure;

FIGS. 12A and 12B are schematic diagrams of a comparison of a mounting strip load and a side load of a screen, in accordance with the present disclosure;

DETAILED DESCRIPTION

Figure 1:
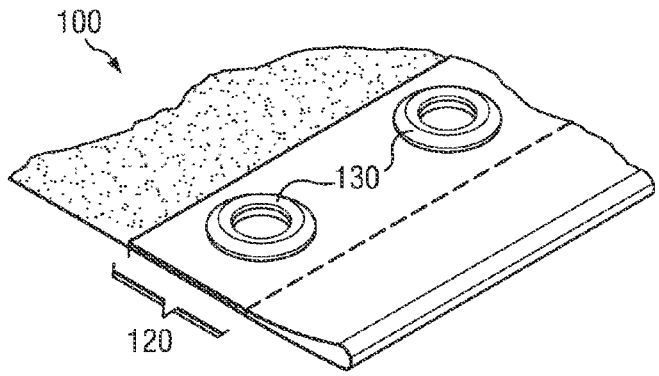
FIG. 1 is a schematic diagram illustrating a perspective view of one known embodiment of edge reinforcement of a screen edge, in accordance with the present disclosure.

Generally, one embodiment of the present disclosure may take the form of a method for managing strain primarily induced by a non-uniform load on a screen. This method may include using a high-elastic modulus substrate for the screen and fastening a stiffening strip proximate to at least two edges of the high-elastic modulus substrate. The stiffening strip may substantially distribute the load on the screen. The method may also include attaching at least one mechanical vibration device proximate to the stiffening strip. In one example, the at least one mechanical vibration device may be a transducer and also may be a number of other devices as discussed herein. The method may also include vibrating the screen using the at least one transducer so that less than an approximately ten percent light intensity variation results. The frequency range of the at least one transducer may be approximately 2-500 Hz.

Another embodiment of the present disclosure may take the form of a projection screen operable to be mounted under a non-uniform load. The projection screen may include a high-elastic modulus substrate and a stiffening strip proximate to at least two edges of the high-elastic modulus substrate, wherein the stiffening strip may result in a substantially uniform optical appearance of the projection screen. The high-elastic modulus substrate may be any appropriate substrate including one of a polycarbonate substrate or a PET substrate. The stiffening strip may be located at least at the top and bottom of the projection screen, but may also be located on the sides of the screen as well. Additionally, the stiffening strip and the high-elastic modulus substrate of the projection screen may be the same material.

Continuing this embodiment, a non-uniform load may be induced on the projection screen and spring connection points may be used to generate localized loads. The coefficient of thermal expansion of the stiffening strip may be substantially the same as the high-elastic modulus substrate. Further, the stiffening strip may be attached to the high-elastic modulus substrate surface using one of a pressure sensitive adhesive or a UV glue. The stiffening strip also may be attached to the screen using any of the methods discussed herein. The stiffening strip may be attached to both the front surface and the back surface of the high-elastic modulus substrate to place the high-elastic modulus substrate under an approximately neutral mechanical load when the projection screen is rolled. The projection screen may also include at least one vibration device located proximate to the stiffening strip and the vibration device may be a transducer. The at least one transducer may be operable to vibrate the high-elastic modulus substrate while maintaining less than approximately ten percent intensity variation across the projection screen.

Another embodiment of the present disclosure may take the form of a projection screen. The projection screen may include a high-elastic modulus substrate and at least one vibration device proximate to the high-elastic modulus substrate. The at least one vibration device may be a transducer which may be operable to vibrate the high-elastic modulus substrate while maintaining less than approximately ten percent intensity variation across the screen. The projection screen may include a mounting strip proximate to at least two edges of the projection screen and the mounting strip may be a high-elastic modulus material. The high-elastic modulus substrate and the mounting strip may be the same material. The vibration device may be mounted to the mounting strip in at least one location. Additionally, the vibration generated by the vibration device may be sufficient to reduce the speckle contrast to less than approximately 15 percent speckle contrast.

Generally, another embodiment of the present disclosure may take the form of a method for reducing speckle in displays. The method may include enabling the use of a high-elastic modulus substrate by fastening a mounting strip proximate to the edges of the substrate and allowing vibration to propagate through the high-elastic modulus substrate by using a mechanical vibrating device proximate to the mounting strip.

Speckle

The use of coherent or partially coherent sources such as, but not limited to, lasers, LEDs, and so on, can have advantages in display or illumination over standard incoherent sources such as lamps. The advantages may include higher brightness, better reliability, and larger color gamut may be achieved. However, a partially coherent source used for illumination may result in speckle on the screen. Speckle may be a result of statistical interference of light from the screen or target that causes variations in intensity on the retina which may be objectionable to observers. These typically high frequency intensity variations may be undesirable for display or imaging applications.

While speckle is readily apparent when using coherent laser sources for illumination, it is also present to a lesser degree when using a conventional UHP or Xenon lamp. Due to the relatively large ratio of projector-screen distance to projector aperture, the light acquires a significant amount of spatial coherence on the order of approximately several hundred microns. With silver screens, this spatial coherence may be visible as chromatic speckle when viewing the screen in the specular direction.

Although speckle is known in the art as a problem, the problem of speckle has not been satisfactorily addressed. A known technique for measuring and characterization of speckle is performed by measuring the approximate contrast of the light intensity. This may be determined by the standard deviation over the mean of the intensity. For speckle measurement, see Jacques Gollier, "Speckle measurement procedure," Tech. rep., (Corning Incorporated, from the Conference Projector Summit May 2010), which is herein incorporated by reference in its entirety.

Techniques to Reduce Speckle

One family of solutions uses moving diffusers (one or many) to achieve changes to the phase locally to temporally average out some of the speckle over the observer's/detector's integration period. For examples and general discussion, see U.S. Pat. No. 5,313,479, "Speckle-free display system using coherent light," and U.S. Pat. No. 7,585,078, "Illumination system capable of eliminating laser speckle and projection system employing the same". The diffusers can also be vibrating with amplitude that is large enough to cover several diffractive elements to achieve some averaging as well. For examples and general discussion, see U.S. Pat. No. 7,922,333, "Projector, screen, projector system, and scintillation removing apparatus for removing scintillation on an image."

Another family of solutions to reduce speckle use moving mirrors or phase modulators to achieve temporal averaging, but also use expensive moving parts or phase modulators. For examples and general discussion, see U.S. Pat. Pub. No. 2011/0102748, "Optical system and method" and U.S. Pat. Pub. No. 2010/0053476, "Systems and methods for despeckling a laser light source", U.S. Pat. No. 4,155,630, "Speckle elimination by random spatial phase modulation", and U.S. Pat. No. 7,489,714, "Speckle reduction laser and laser display apparatus having the same."

Yet another solution may use a large core, long, very high numerical aperture (NA) multimode fiber to "decoher" a laser beam. U.S. Pat. Application No. 2009/0168025, "Decohered laser light production system" discusses the use of a 12 mm diameter core fiber with a NA of 0.65. This large fiber may provide some reduction in speckle but destroys the brightness of the system since the &endue is so very large. Similarly using a very long multimode fiber can have some benefits as generally discussed in U.S. Pat. Pub. No. 2010/0079848, "Speckle reduction in display systems that employ coherent light sources," but reduces the power with absorption. However, multimode fiber speckle issues and solutions appear to be well known in the field of optical fiber communications. For general discussion, see the book Speckle Phenomena in Optics, by Joseph Goodman (Roberts and Company, 2006, Chapter 7).

A large family of solutions has been proposed involving dividing a light beam up into parts and then forcing each part to have different path lengths or changes of polarization before recombining the light beam. Examples using fiber bundles or splitter/combiners or lenslet arrays include: U.S. Pat. Application No. 2005/0008290 "Static method for laser speckle reduction and apparatus for reducing speckle," and U.S. Pat. No. 4,360,372, "Fiber optic element for reducing speckle noise," U.S. Pat. No. 6,895,149, "Apparatus for beam homogenization and speckle reduction," U.S. Pat. No. 7,379,651, "Method and apparatus for reducing laser speckle," and U.S. Pat. No. 7,527,384, "Illumination system to eliminate laser speckle and projection system employing the same," U.S. Pat. No. 7,719,738, "Method and apparatus for reducing laser speckle." These methods use expensive fiber bundles or lens arrays or many fiber coupler/splitters to achieve some reduction in speckle, but are not entirely effective.

Another family of solutions exists utilizing sources with larger spectral bandwidths. This can be achieved by chirping the drive current, using several lasers of different wavelengths or other means.

Another potential solution is generally discussed in the book "Speckle Phenomena in Optics", by Joseph Goodman (Roberts and Company, 2006, Chapter 6). The needed, linear shift rate of the screen is calculated in x or y or screen rotation, with the motion in the plane of the screen, which is roughly normal to the projection, in order to average out some of the speckle during the observer's/detector's time integration period. By moving the screen in the screen plane, the light hits different parts of the screen which may then change the speckle pattern. If this is done fast relative to the detector's integration period, for example the eye is roughly 20 Hz, then the detector may see an average of several speckle patterns which results in a lower speckle contrast. U.S. Pat. No. 5,272,473, "Reduced-speckle display system" disclosed the use of a transducer attached directly to the screen to mechanically generate surface acoustic waves to minimize speckle. U.S. Pat. No. 6,122,023, "Non-speckle liquid crystal projection display" uses a highly scattering liquid crystal as a screen and then electrically changes the liquid crystal states to alleviate speckle. Other patents have used scattering liquids or diffuser cells as screens to improve speckle, such as U.S. Pat. No. 6,844,970, "Projection television set, screens, and method," U.S. Pat. No. 7,199,933, "Image projection screen with reduced speckle noise," U.S. Pat. No. 7,244,028, "Laser illuminated projection displays," U.S. Pat. No. 7,342,719, "Projection screen with reduced speckle," and U.S. Pat. Application No. 2010/0118397, "Reduced laser speckle projection screen."

In addition, vibration of the screen has been experimentally shown to reduce speckle for standard projection lamps and may be useful with lamp based projection. However, traditional screens typically require the vibration device or transducer attached to the backside of the screen or in physical contact with the backside of the illuminated part of the screen. In fact, traditional large cinema screens likely require an array of transducers spaced across the entire area of the screen in order to successfully vibrate the screen. The spacing of the transducer array may be 2 to 15 ft between transducers in both x and y direction of the screen. The disadvantage of this is that the transducer may be visible from the viewing side. However, due to the mechanical properties of traditional screen substrates the close spacing is required. Typical vibration frequencies use ranges from 10 to 50 Hz. These low frequencies have the potential to be highly visible to the human eye, and thus undesirable for use. Higher frequencies typically do not propagate well in conventional substrates due to the low-elastic modulus of conventional substrates.

In practice, it is common to use a few of the techniques together in order to reduce speckle to an acceptable level. All of these involve using many other additional parts and/or motion to achieve some reduction on speckle. These additional parts increase cost, decrease brightness of the projection system, and reduce the reliability of the projection system.

As previously discussed, conventional cinema screens are assembled from a low-elastic modulus material such as poly-vinyl-chloride ("PVC") substrate that is either cast to full size or seamed together from roll stock. The modulus can be measured with a standard pull test method among other methods. Typically PVC and other low-elastic modulus materials may have a modulus in the approximate range of 30 to 100 megapascal (MPa). The substrate may or may not be perforated in order to enable the installation of acoustic speakers behind the screen. The edges of the screen are then reinforced and then pierced with grommets for attaching springs as shown in FIG. 1.

FIG. 1 is a schematic diagram illustrating a perspective view of one known embodiment of edge reinforcement of a screen edge. As illustrated in FIG. 1, the substrate 100 may have a region with an edge 110 folded over. The folded-over portion of the substrate may be welded to the main part of the substrate. This welded area 120 may then be pierced with grommets 130. The grommets 130 may be used for mounting the screen to a frame using springs or any other appropriate mounting hardware that provides suitable tension to the mounted screen. At the time of installation, the screen is tensioned on the frame using springs as illustrated in FIG. 2 or with elastic cord to attach the screen via the grommets to the frame.

Figure 2:
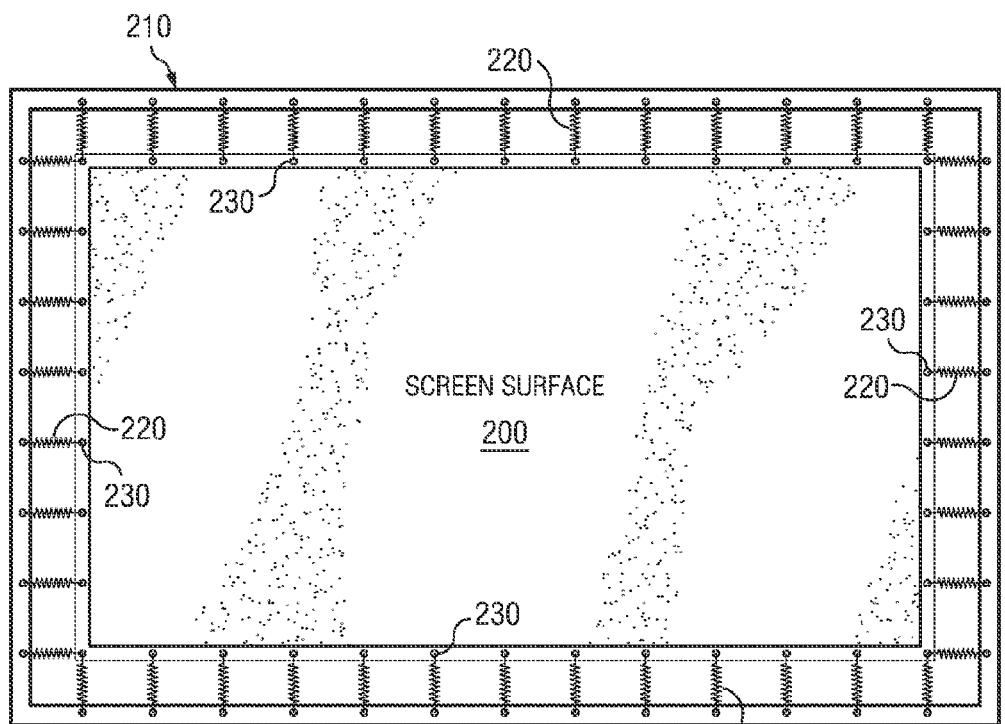
FIG. 2 is a schematic diagram illustrating a front view of one known embodiment of screen mounting.

FIG. 2 is a schematic diagram illustrating a front view of one known embodiment of screen mounting. As illustrated in FIG. 2, the screen 200 is mounted to a frame 210. The screen 200 in FIG. 2 may be mounted to the frame 210 with springs 220 as discussed with respect to FIG. 1. The springs 220 may attach the screen 200 through holes or grommets 230 in the screen 200. In some cases, the screen is wrapped around the frame and the tensioning is done behind the screen. In all cases, the elasticity of the screen substrate enables it to stretch to a more uniform surface.

It is challenging to manufacture a perfectly planar sheet of substrate. Differences in local drying/casting conditions can cause differences in thickness of the roll stock. More problematically, cross-web differences in the casting conditions can result in differences in the length of the material. The change in length is a simple gradient referred to as camber. One edge of the roll is longer than the other as illustrated as camber in FIG. 3.

Figure 3:
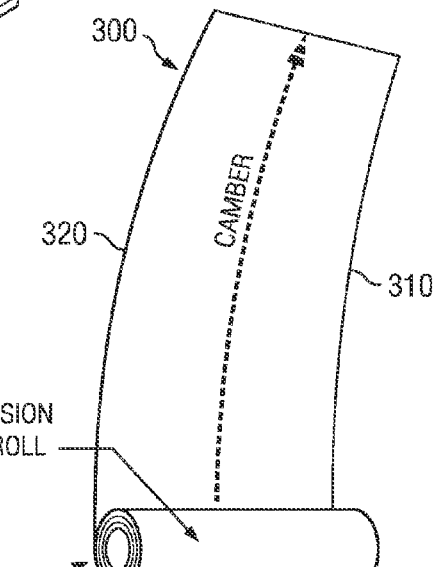
FIG. 3 is a schematic diagram illustrating a perspective view of one embodiment of the camber of a material roll.

FIG. 3 is a schematic diagram illustrating one embodiment of the camber of a material roll. As illustrated in FIG. 3, the substrate 300 has a short edge 310 and a long edge 320. As previously discussed, the differences in the edge lengths may commonly result from drying/casting conditions. As the substrate 300 is wound tightly on a core 330, the short edge 310 of the roll will be under more tension and if the roll were unwound onto a sufficiently large surface it would transcribe a circle. More complicated situations also happen in which the middle sections of the web are longer/shorter than the edges. In this case, the material would ripple in the longer regions in the middle/edge. Finally, temporary distortions or wrinkles may be induced in the substrate during shipping and/or installation. Consequently, when a screen is tensioned, sufficient tension must be applied in order to stretch the shorter regions to have the same length as the longer regions and to remove any other distortions.

In theory, it is possible to mount a membrane or substrate between a set of point attachments and, as long as the points are all contained within a plane, achieve a perfectly planar surface with infinitesimal mounting tension. However, due to the weight of the screen under gravity as well as the ripple requirements discussed above, it is desirable to apply a finite tension at each mounting point. When these loads are applied, they may induce a strain in the substrate as shown in FIG. 4A.

Figure 4A:
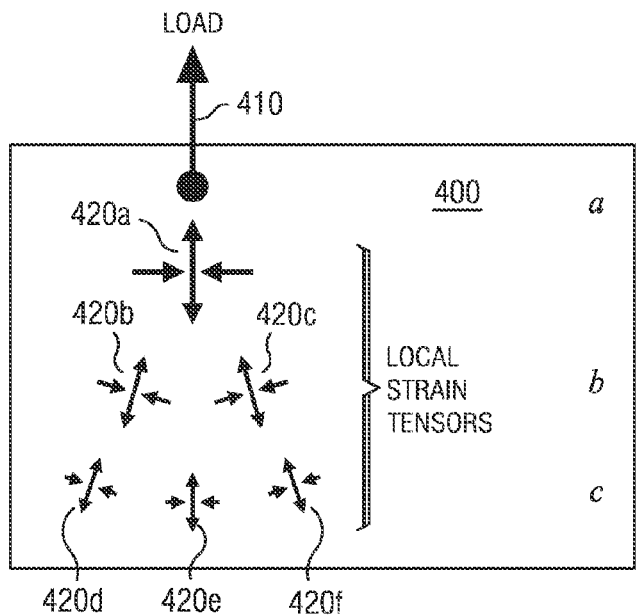
FIG. 4A is a schematic diagram illustrating a front view of one way in which a point load acts on an elastic sheet.

FIG. 4A is a schematic diagram illustrating a front view of one way in which a point load acts on an elastic sheet. As illustrated in FIG. 4A, an elastic sheet 400 may be placed under some type of load 410. Near the point load, the strain in the elastic sheet 400 is substantially localized and expansive in the direction of the force as illustrated with the local strain tensor 420a. A point load is a specific case, but the same issues arise to a greater or lesser extent under any non-uniform or discontinuous load. The load in the elastic sheet of FIG. 4A is illustrated with arrows indicating direction and magnitude in the strain tensors for illustrative and discussion purposes only. The elastic sheet of FIG. 4a may be generally representative of a screen substrate. As shown, the generally upward arrow of the strain tensor 420a is substantially in the same direction as the load 410. Additionally, because most materials have a positive Poisson's ratio, the elastic sheet 400 may be compressed in the transverse direction as shown by the arrows pointing generally inwards for strain tensor 420a. Farther away from the point load 410, the strained region of the elastic sheet 400 becomes broader, as generally illustrated by strain tensors 420b, 420c, 420d, 420e, and 420f. This has the effect of decreasing the magnitude of the strain in both directions, which is also generally illustrated by the length of the arrows in the strain tensors 420a, 420b, 420c, 420d, 420e, and 420f. Sufficiently far from the point of loading, the strain approaches a substantially uniform value in the elastic sheet. The distance to achieve this approximately uniform value is proportional to the flexural modulus of the substrate. In the region of the increased localized strain, the substrate may be shorter in the transverse direction as shown in FIG. 4B and correspondingly the substrate may be longer in the longitudinal direction.

Figure 4B:
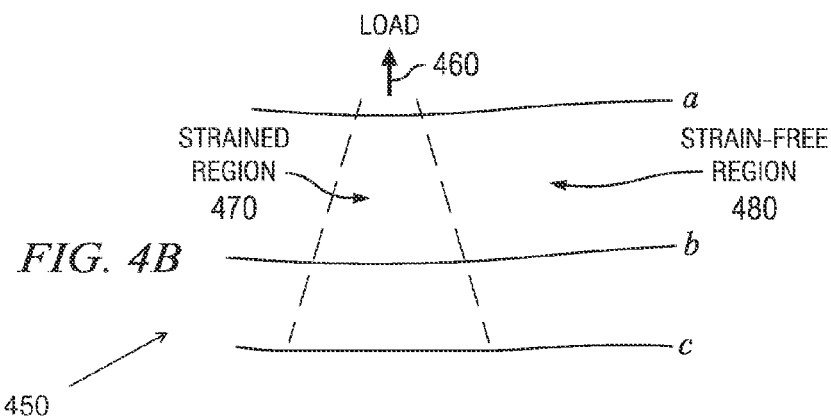
FIG. 4B is a schematic diagram illustrating cross sectional views of a point-loaded substrate.

FIG. 4B is a schematic diagram illustrating cross sectional views of a point-loaded substrate. As illustrated in FIG. 4B, the substrate 450 has an applied load 460. The load 460 may cause a region of non-uniform strain shown as a strained region 470 and a strain-free region 480. This mismatch in local physical dimensions of the substrate leads to a wrinkle distortion of the substrate in the illustrated region of non-uniform strain. The wrinkle distortion may cause an objectionable visible artifact on the substrate. To avoid such wrinkles, the force applied to the mounting points may be balanced. In addition, most conventional screens use a vinyl substrate with a vanishingly small flexural modulus in order to minimize the region of non-uniform strain.

Figure 5A:
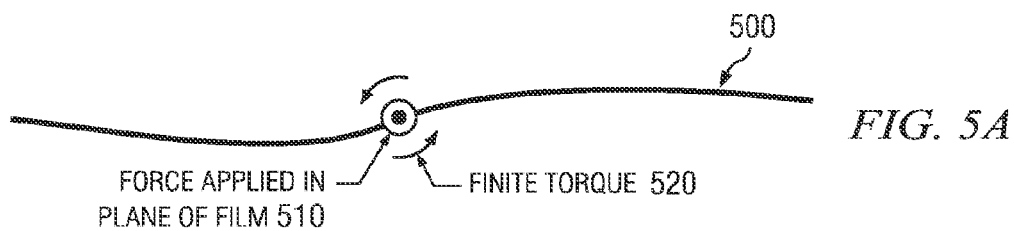
FIG. 5A is a schematic diagram illustrating a cross sectional view of a substrate at an attachment point.
Figure 5B:
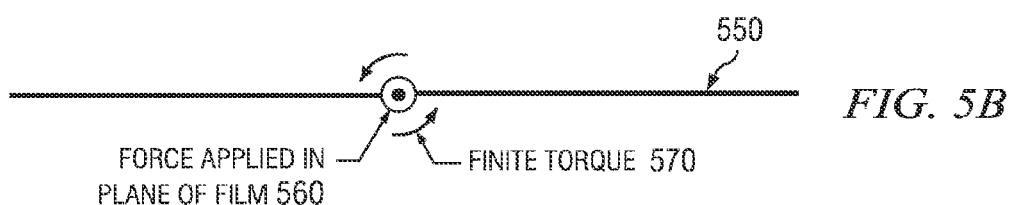
FIG. 5B is a schematic diagram illustrating a cross sectional view of a substrate at an attachment point.

Additionally, for substrates with a finite flexural modulus, if a torque is applied at the attachment point, then a ripple can be induced in the film. FIGS. 5A and 5B are schematic diagrams illustrating a cross sectional view of a substrate at an attachment point. The direction of the load is shown as an arrowhead or a dot within a circle. As illustrated in FIG. 5A, the substrate 500 has a force applied to it in the plane of the film 510. The direction of the force 510 may produce a finite torque 520, which, in turn, may induce a wave in the substrate the magnitude of which is proportional to the flexural modulus of the substrate. FIG. 5B illustrates a substrate 550 with a force applied to it in the plane of film 560. The direction of the force 560 may produce a finite torque 570 to the substrate 550. Even though similar loads are applied to the substrates of FIGS. 5A and 5B, because the substrate of FIG. 5B is a material such as flexible PVC screen substrate with a low-elastic modulus which has negligible flexural modulus, the loads affect the substrates differently. Stated differently, in FIG. 5B, the magnitude of the wave induced in the substrate 550 is approximately zero and the local distortion caused by the twist of the mounting point may not propagate into the bulk of the screen.

Ripples in the screen surface may be visible in different ways. In extreme cases the ripple may be apparent as a distortion in the image. For example, pixel locations may be visibly distorted due to the non-smooth surface of the screen. In addition to the geometrical distortion, there may be a brightness distortion primarily due to the angular dependence of the reflectivity of the screen. For example, an approximately one degree change in the surface normal orientation can lead to change in reflected intensity as large as approximately five percent in some viewing orientations. If the screen is adjusted such that there is little to no visible distortion in the image geometry, there may still be an objectionable visible artifact due to the angle dependence of the reflectivity.

Figure 6A:
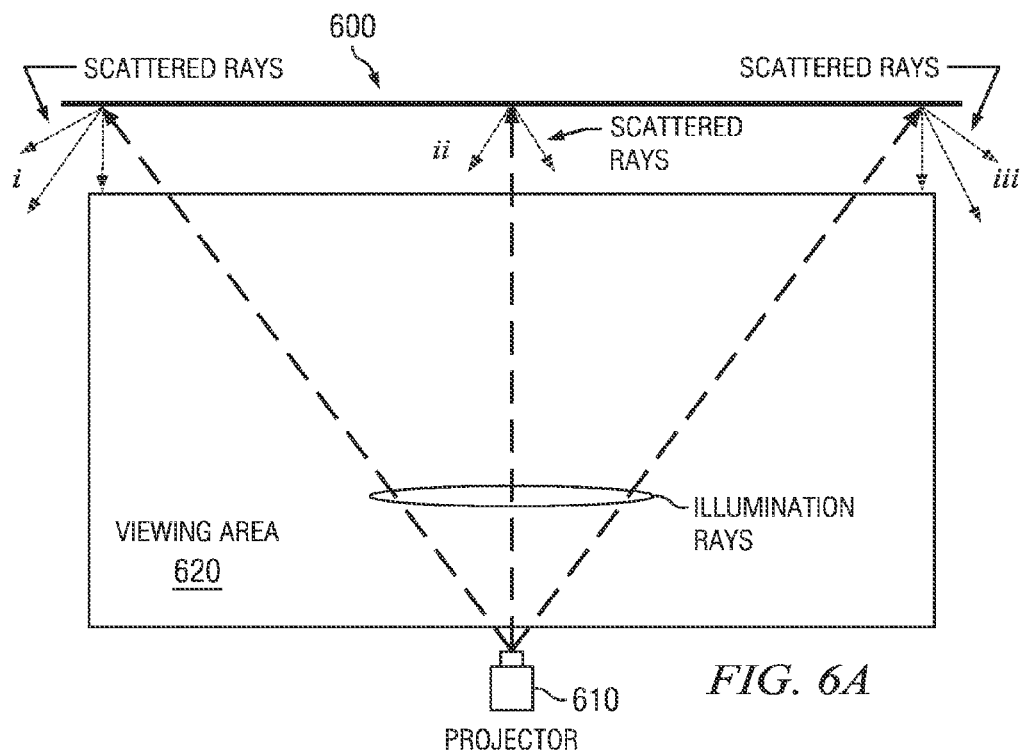
FIG. 6A is a schematic diagram illustrating one embodiment of a top-down view of a flat screen mounting.
Figure 6B:
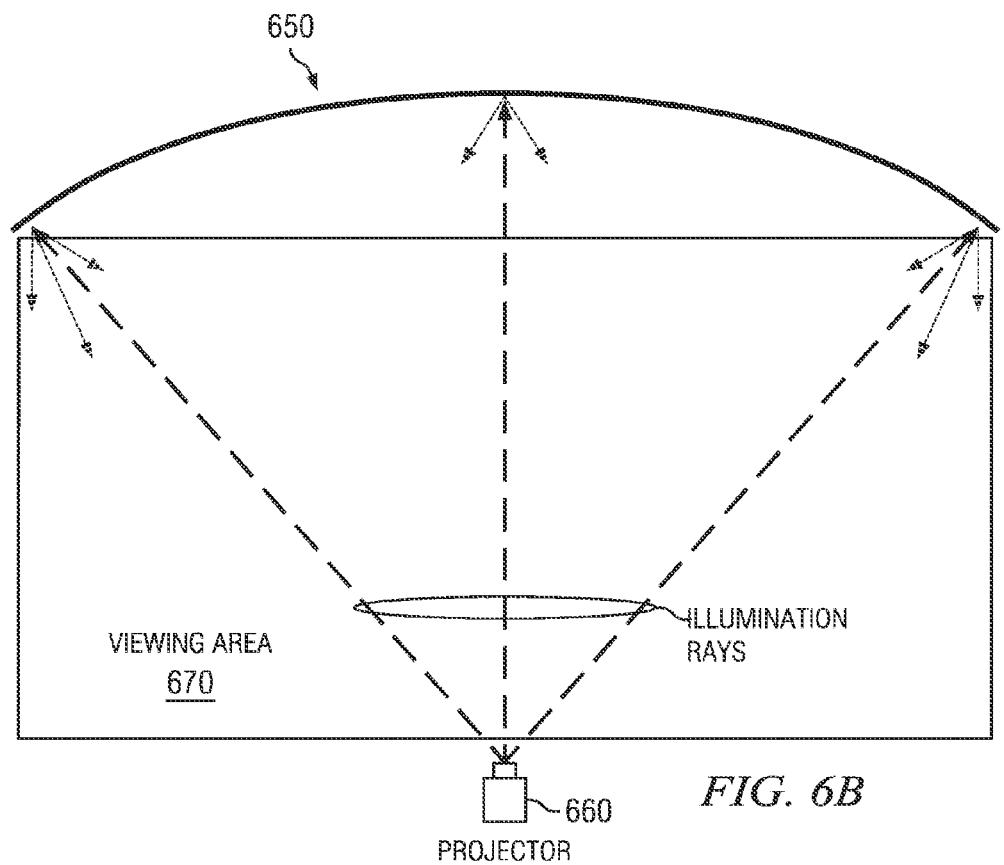
FIG. 6B is a schematic diagram illustrating one embodiment of a top-down view of a curved screen mounting.

In one example, a gain coating may be applied to a screen substrate, and the surface or screen substrate may be curved in order to obtain the brightest and most uniform presentation. FIG. 6A is a schematic diagram illustrating one embodiment of a top-down view of a flat screen mounting. FIG. 6A shows a schematic of a theater with a flat screen 600. Although the screen 600 is discussed as flat with respect to FIG. 6A, the screen is mounted on an approximately flat mount as opposed to being mounted on a curved mount as shown in FIG. 6B. In FIG. 6A, the projector 610 directs light towards the screen 600. The light may reflect from the screen 600 generally towards a viewing area 620. However, due to the angular distribution of the scattered light versus illumination direction, scattered rays in the middle of the screen ii may be approximately centered on the viewing area whereas scattered rays near or at the edges of the screen i, iii primarily miss the viewing region 620. This may be a source of the so-called "hot-spot" viewable on screens with gain >1 such as silver screens. A common known solution to this problem is shown in FIGS. 6B, 6C, and 6D in which the screen is curved.

Figure 6C:
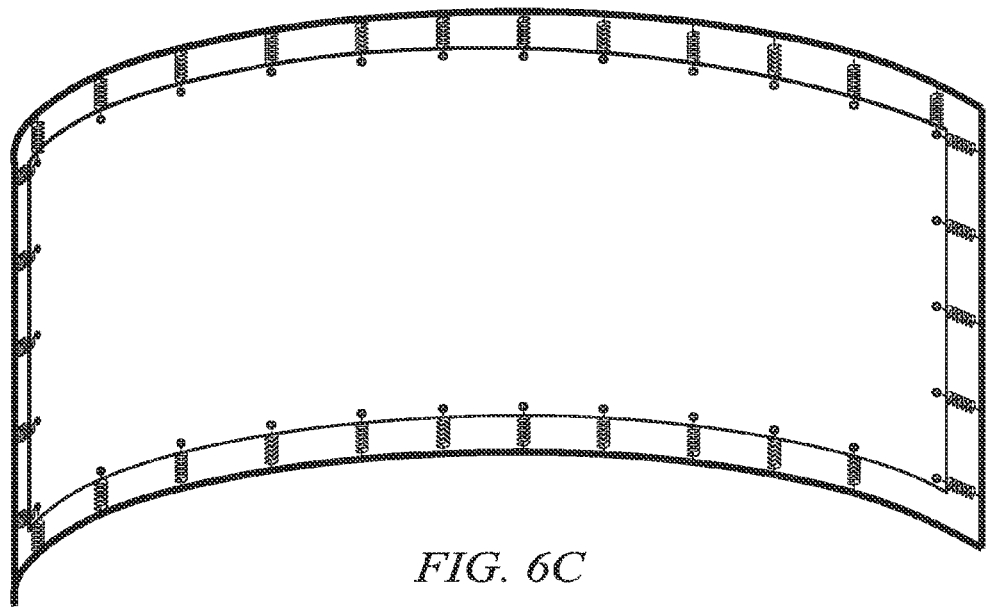
FIG. 6C is a schematic diagram illustrating one embodiment of a perspective view of a curved screen mounting.
Figure 6D:
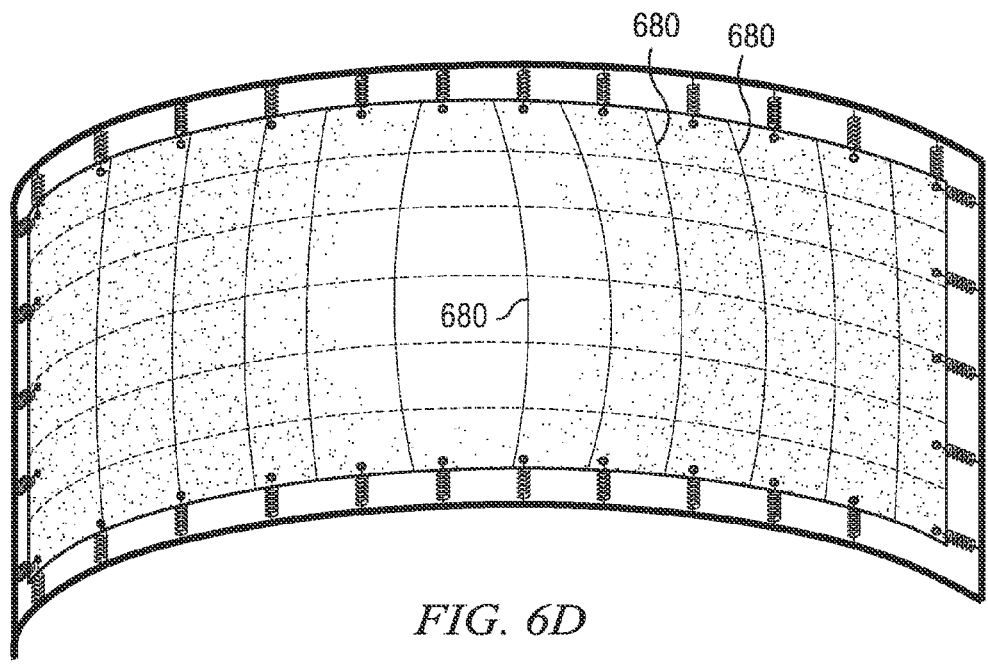
FIG. 6D is a schematic diagram illustrating one embodiment of a perspective view of a curved screen mounting.

FIGS. 6B, 6C, and 6C are schematic diagrams illustrating one embodiment of a curved screen mounting. As illustrated in FIG. 6B, the projector 660 directs light toward the screen 650. In this case, the bulk of the scattered rays from all three regions i, ii, and iii, enter the viewing area 670. Additionally, FIG. 6C illustrates a perspective view of a curved screen mounting and FIG. 6D illustrates a perspective view with curved contour lines 680, the contour lines showing the approximate curvature of the screen substrate when a screen is mounted on a curved screen mounting.

Figure 7A:
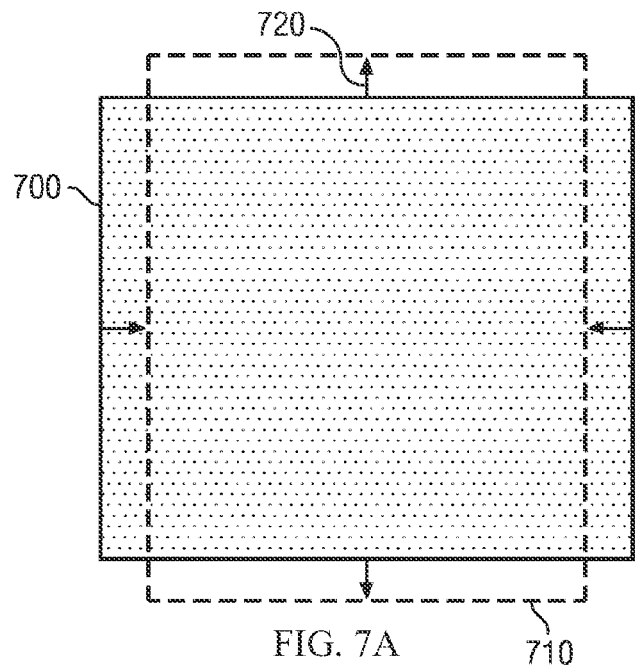
FIG. 7A is a schematic diagram illustrating a front-view of one embodiment of Poisson's ratio effect of stretching screen material.

Unfortunately, a frequent consequence of curving the screen is the formation of "belly." If an elastic sheet is suspended vertically between two horizontal approximately parallel rails and subjected to a vertical tension, it may naturally stretch in the vertical direction by an amount approximately inversely proportional to its elastic modulus as shown in FIG. 7A. FIG. 7A is a schematic diagram illustrating a front-view of one embodiment of Poisson's ratio effect of stretching screen material. As illustrated in FIG. 7A, the original substrate 700 may have a different shape than a loaded substrate 710. The loaded substrate 710 may be subjected to a load 720. At the same time, the loaded substrate 710 may contract along both horizontal axes unless it has a negative Poisson's ratio. Side tension must then be maintained at the two vertical edges (side edges) of the sheet in order to maintain an approximately rectangular shape. However, if the two horizontal rails are curved, the side tension may have an additional consequence: because the side tension may no longer be acting within a plane, there may be a resultant force outward on the center of the screen as shown in FIG. 7B.

Figure 7B:
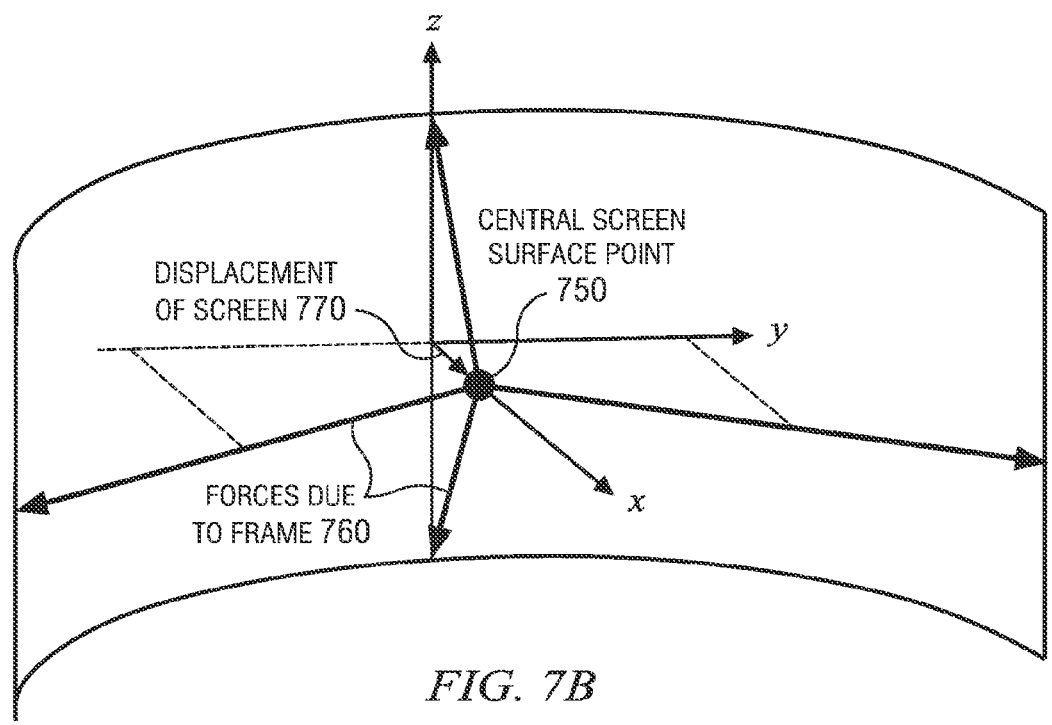
FIG. 7B is a schematic diagram illustrating a perspective diagram of one embodiment of the force balance on a screen center.

FIG. 7B is a schematic diagram illustrating a perspective diagram of one embodiment of the force balance on a screen center. As illustrated in FIG. 7B, the central screen surface point 750 is located with respect to the origin of an x-y-z coordinate system for discussion purposes. Also shown are loads or forces applied to the screen 760 by the mounting frame, in the approximately positive and negative z-direction as well as the approximately positive and negative y-direction. The center of the screen may then move out toward the audience-side of the curve until the outward force due to the side tension is approximately balanced by a restoring force due to the horizontal bars. The displacement of the screen center 770 is illustrated in the general x-direction. The result may be that the radius of curvature at the center of the screen is larger than the intended radius of curvature which may still be maintained at the top and bottom rails.

Figure 8:
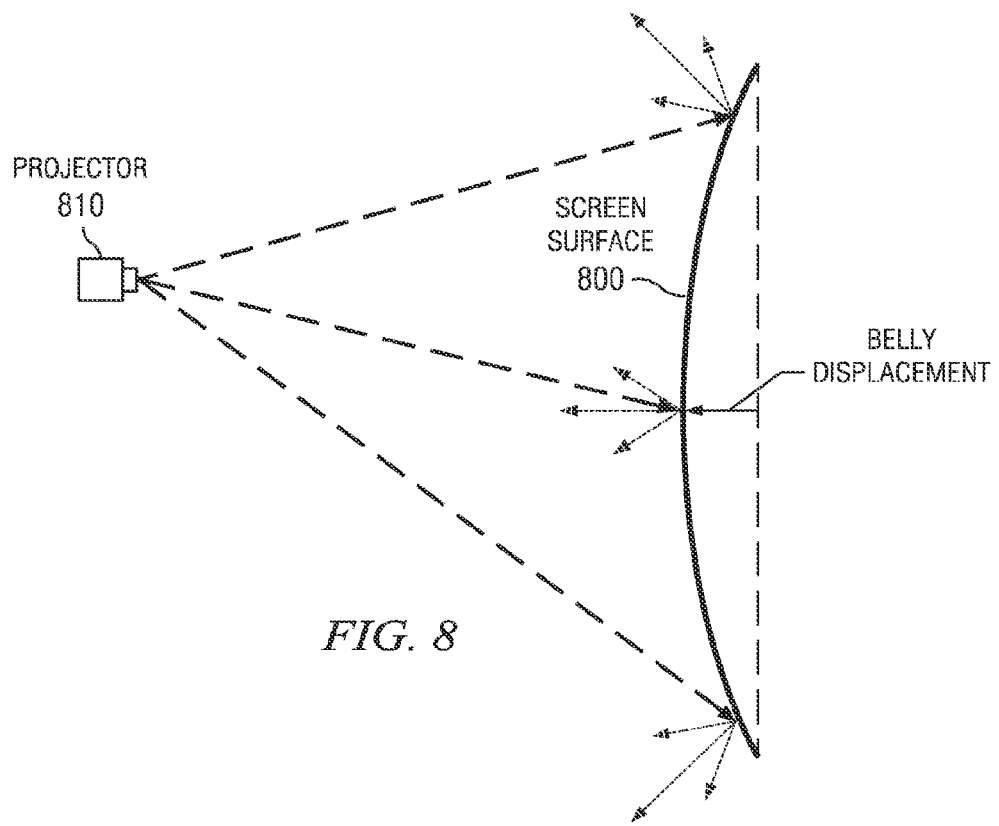
FIG. 8 is a schematic diagram illustrating one embodiment of a side view cross-section of a screen center with belly displacement.

FIG. 8 is a schematic diagram illustrating one embodiment of a side view cross-section of a screen center with belly displacement. As illustrated in FIG. 8, the view of the screen is a vertical cross-section of the screen viewed from the side of the screen. In FIG. 8, the screen surface 800 is curved toward the audience side of the screen. Stated differently, the belly, as discussed with respect to FIG. 7B, is toward the audience side of the screen. As a result, when the projector 810 directs light toward the screen surface 800, the light rays may scatter outside of the intended viewing region. Because of the belly, the scattered rays at the top and bottom of the screen may be deflected farther away from the audience and out of the viewing region. This phenomenon is primarily a function of the amount of elastic deformation in the substrate.

Many smaller screens such as those for professional and consumer markets use the same mounting approaches on a smaller scale. These screens may be typically either laced or snapped to the mounting frame. Roll-up solutions are also available which rely on side tensioning, for example DaLite's Tensioned Advantage. Many more small format screens, most notably roll-up screens, are made from less elastic substrates such as PET, PC, and some textiles. For matte surfaces, many of these screens have acceptable appearance, but there is currently no acceptable solution for gain screens such as polarization preserving screens.

One embodiment of this disclosure may use a rigid stiffening strip at the edges of a cinema screen in order to enable the use of a high-elastic modulus substrate. High-elastic modulus substrates may include substrates such as PC, PET, and so forth. In one example, the substrates may be fire-retardant substrates. These high-elastic modulus substrates may be in the approximate range of >1000 MPa as compared to the low-elastic modulus substrates which may be in the approximate range of <300 MPa Furthermore, the stiffening strip may enable the use of screen vibration to reduce speckle in display applications, as illustrated in FIG. 9.

Figure 9:
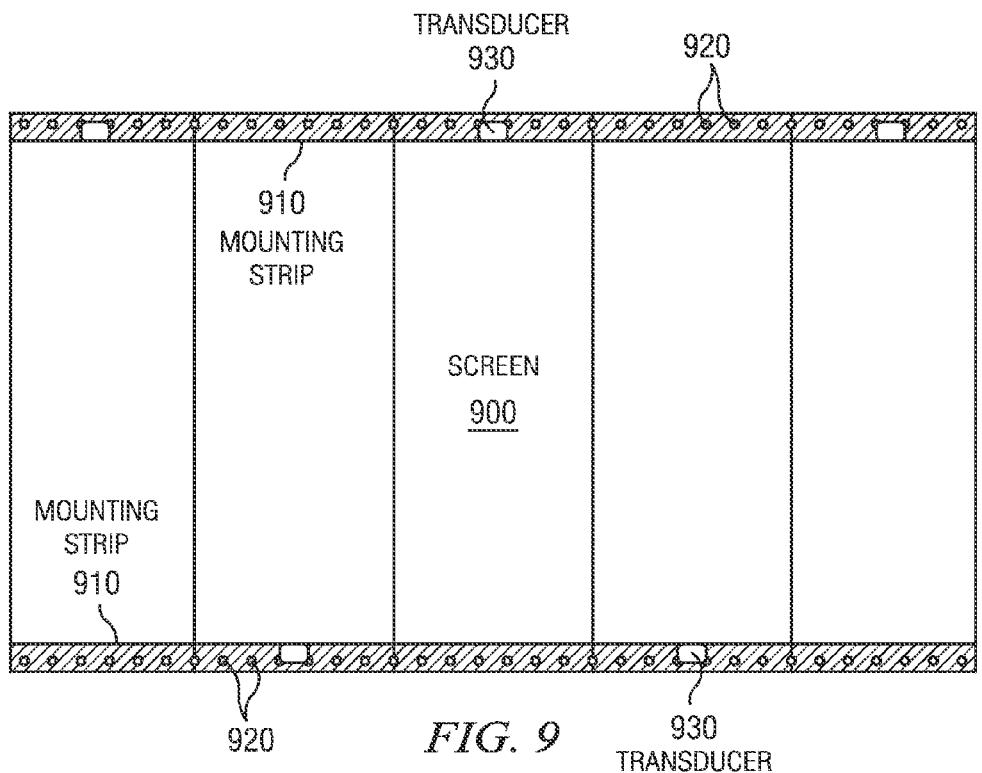
FIG. 9 is a schematic diagram illustrating one embodiment of a front view of a screen layout including mounting strips and transducers, in accordance with the present disclosure.

FIG. 9 is a schematic diagram illustrating one embodiment of a front view of a screen layout including mounting strips and transducers, in accordance with the present disclosure. Although FIG. 9 is illustrated with mounting strips on the top and the bottom of the screen, in another embodiment, mounting strips may be additionally mounted to the sides of the screen as discussed herein. In FIG. 9, the screen 900 has mounting strips 910 mounted at the top and bottom of the substrate. The mounting strips may serve to substantially distribute the strain that may be induced by the point loads that attach the screen to the frame. For example, springs (or other tensioning spring equivalents) may be placed in the holes 920 to attach the screen substrate to a mounting frame. The springs may induce point loads, and thus strain, on the screen substrate which may result in objectionable visible artifacts. Also illustrated in FIG. 9 are transducers 930. The transducers 930 may serve to substantially reduce speckle on the screen substrate. Although transducers are illustrated in FIG. 9 as the vibration device, the vibration device may be any appropriate vibration device including, but not limited to, mechanical vibration devices such as off axis or unbalanced motors, flexures or regular motors, either linear motion or rotary, such as voice coils as well as piezo-electric transducers or other types of vibration devices, individually, or in any combination thereof. The transducers will be discussed in further detail herein.

Significant optical performance improvements in the screen can be realized by utilizing an engineered polarization preserving screen surface, as described in commonly-owned U.S. Pat. No. 8,072,681, entitled "Polarization preserving front screen material," to Coleman et al., which is herein incorporated by reference in its entirety. For proper fidelity, a more rigid substrate such as polyester or polycarbonate may be used. A hybrid approach may use the embossed surface to texture metal flake as described in commonly-owned U.S. Pat. No. 8,169,699, entitled "Polarization preserving projection screen with engineered pigment and method for making same," to Petersen et al., or to physically chop the metalized substrate as described in commonly-owned U.S. Pat. No. 8,194,315, entitled "Polarization preserving projection screen with engineered particle and method for making same," to Sharp et al., both of which are herein incorporated by reference in their entirety, either of which may be utilized to replace the metal flake in a conventional screen system. Rear-projection polarization preserving screens typically employ a diffusely scattering transparent polymer substrate, an embossed transparent substrate, or a combination of the two. The aforementioned substrates and therefore the screen may be fabricated from the aforementioned substrates and may be much lighter and have a higher modulus and may be referred to herein as engineered screens.

Because of the much higher elastic modulus of the screen substrates and more importantly because of the non-negligible flexural and shear moduli in these substrates for engineered screens, a new method of mounting may be preferable. For instance, a large point-load induced strain may become spatially homogenous in a short distance in a low-elastic modulus screen, thus resulting in undesirable optical artifacts. A similar strain may propagate too far into the bulk of the substrate in a higher elastic modulus substrate. Therefore, localized loads, for example from a spring connection point, may desirably, either be completely avoided or they may be substantially prevented from inducing a corresponding strain.

An embodiment to accomplish a reduction of induced strain from a localized load may be to attach a rigid mounting strip wherever springs or other mounting connections are made. For cinema screens which are often curved around the vertical axis and for which the mass of the screen must be supported, the preferred location for mounting strip may be along the top and bottom edges of the screen. Ideally the coefficient of thermal expansion (CTE) of the mounting strip should match the CTE of the screen. This may be most easily accomplished by manufacturing the mounting strip from a substantially similar or the same material as the screen substrate. If the mounting substrate is made from a different material, then as the viewing environment changes temperature, it may be desirable for the screen surface to maintain sufficient tension to eliminate wrinkles. The mounting strip may be large enough in both width and thickness directions such that when sufficient tension is applied to produce a substantially uniform screen surface, that the induced strain from the mounting strip may be negligibly small. Stated differently, when sufficient tension is applied to a screen surface, the screen surface may be substantially optically or visibly uniform and visible changes appear to be at, around, or below, a just noticeable different (JND). The JND level depends on the spatial frequency of the disturbance. Typically, for abrupt changes, a JND may be at or around approximately one percent variation of the intensity. For more smoothly varying changes such as waves in the surface, a JND may be around 3-5% variation in intensity. In one example, it may be understood that non-uniformities or optical artifacts are substantially homogenized, averaged, or acceptable, when the human eye cannot detect the non-uniformities at one or more of the following scales: just resolvable dimension, just resolvable area, just noticeable difference, and so on. For example, an approximately 0.175 mm thick PC screen substrate and a mounting strip of total thickness of approximately 1.6 mm and approximately 10 cm width may be effective at making any induced strain in the screen substantially imperceptible. Holes may then be punched through the mounting strip in order to attach springs to the screen as shown in FIGS. 10A, 10B, and 10C.

Figure 10A:
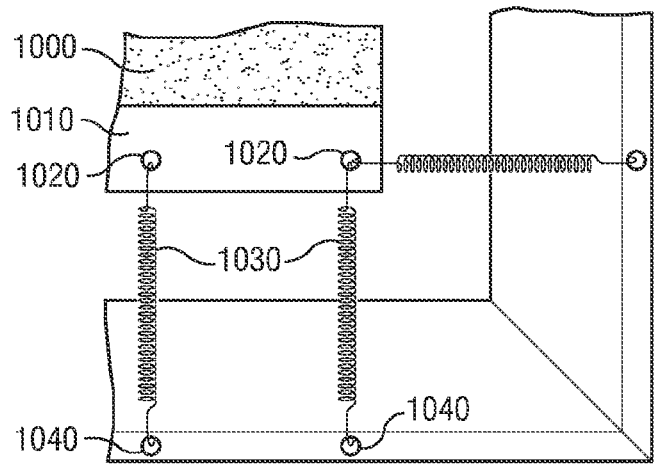
FIGS. 10A, 10B, and 10C are schematic diagrams of one embodiment of a data acquisition process, in accordance with the present disclosure.
Figure 10B:
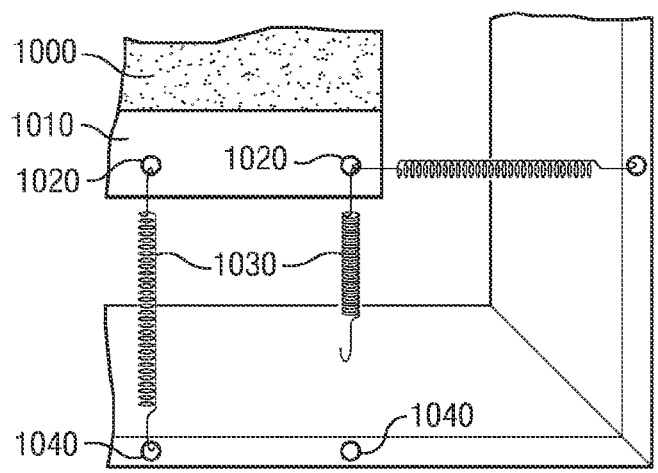
Figure 10C:
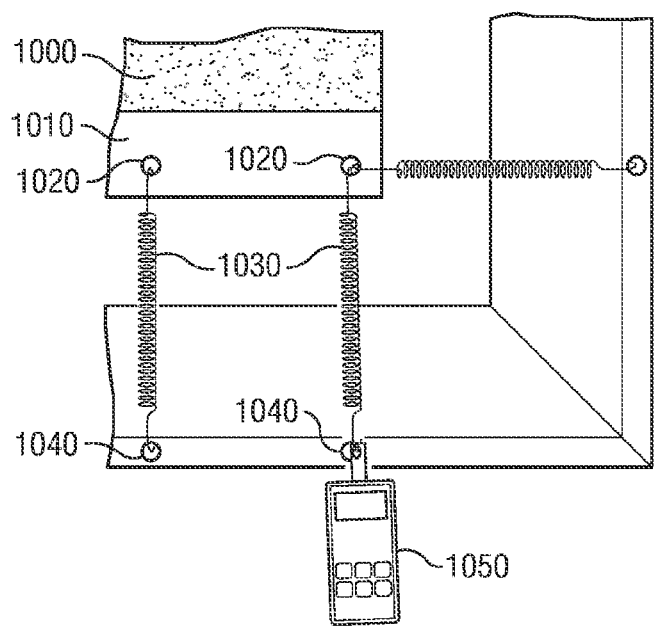

FIGS. 10A, 10B, and 10C are schematic diagrams of a data acquisition process. In FIG. 10A, the screen 1000 has a mounting strip 1010 attached to it. As shown in FIG. 10A, holes 1020 are punched through the mounting strip and the screen and springs 1030 attach the screen 1000 to a mounting frame 1040. The springs attaching the screen to the mounting frame may primarily induce the strain on the screen as previously discussed and may result in objectionable optical artifacts in the surface of the screen greater than a JND. Also shown in FIG. 10C is a data acquisition process. In one example, to obtain the tension that the springs induce on the substrate, a force gauge 1050 may be used to measure the force. The force of the mounting spring may be recorded by attaching the force gauge to the mounting spring and pulling the spring down until it is in approximately the same mounting location as tensioning the screen to the mounting frame. The data may be recorded and then repeated in different locations and also may be recorded multiple times for each of the different locations. This data may be approximately representative of the force that each of the mounting springs applies to the screen 1000.

A range of attachment methods for the mounting strip are available including various adhesives, PSAs, UV glues, and welding processes including solvent, laser, any combination thereof, and so forth. Because there may be little shear force acting between the strip and the screen surface, one method of attaching the strip to the screen surface may be a pressure sensitive adhesive (PSA).

It may be most convenient to attach the mounting strip on only one side of the screen, such as the front or the back of the screen. However, if the screen is then rolled for transportation with the mounting strip on the inside and the screen on the outside, then the screen will be under tension due to its larger radius of curvature relative to the mounting strip which may be in compression. The seams in the screen must be sufficiently strong to resist this tension. If the screen is rolled in the opposite direction then the seams must be able to resist any buckling caused by the compressive force of the mounting strip. In one embodiment, a more mechanically balanced structure may be to decrease the thickness of the mounting strip by a factor of two when compared the thickness of a mounting strip applied to one side of the screen, and then apply the thinner strip to both the front and back of the screen. In this case, the screen surface may be under an approximately neutral mechanical load when it is rolled.

While the mounting strip connected at top and bottom may be effective at distributing the load across the majority of the screen surface, the sides of the screen may not remain free. In order to maintain approximately uniform tension and therefore a substantially smooth surface to the edge of the screen, a slight tension may be applied at the edges of the screen. Any significant point-like strains in the substrate may be avoided and may be accomplished in a number of ways. One embodiment is to apply an additional mounting strip at each side of the screen as illustrated in FIG. 11.

FIG. 11 is a schematic diagram of one embodiment of the present disclosure, showing an exemplary load on a screen. Further, FIGS. 12A and 12B are schematic diagrams of one embodiment of a comparison of a mounting strip load and a side load of a screen. As shown in FIG. 11, screen 1100 may have mounting strips located on the top 1110, bottom 1120, left side 1130, and right side 1140 of the screen. In the one example of FIG. 11, the screen may be approximately 24.5 feet wide and approximately 11.5 feet high (though in other embodiments, other dimensions may be used). In this example, the mounting strips 1110 and 1120 on the top and bottom of the screen are mounted to the front and back of the screen, while the mounting strips on the left and right sides 1130, 1140 of the screen are mounted to the back of the screen. As the numbers in FIG. 11 indicate, the forces on the sides of the screen may be less than the vertical forces acting on the top and bottom of the screen. Additionally, in FIGS. 11, 12A, and 12B, the side forces acting on the side mounting strips may be much less than the vertical forces on the top and bottom mounting strips of the screen, thus the side mounting strips may be approximately half the thickness or less than the top and bottom mounting strips.

Furthermore, because the side mounting strip is unlikely to traverse any seams in the screen, in one example, it may be applied to one surface of the screen, such as the front or back of the screen. In another example, the side mounting strip may also be applied to the front and back of the screen. Mounting holes for side tension may be located approximately every meter but the strip can be punched in the approximate range of every 10-20 cm for convenience. The mounting holes may be punched through both the mounting strip and the screen substrate. An alternative embodiment may be to attach smaller or shorter mounting points at the time of installation. A small section of the bulk mounting strip with a mounting hole pre-punched can be attached with PSA. The mounting strip may be one solid piece the length of the respective side, for each side of the screen (top, bottom, and both sides) or may be multiple smaller pieces of mounting strip that may be approximately the same length of each side of the screen (top, bottom, and both sides). In yet another embodiment, the side mounting strips may be shorter lengths of mounting strip that do not cover the entire height of the screen. In one example, the side mounting strips may be pieces of mounting strip that may be located in a similar location as the spring attachments used to mount the screen to the mounting frame.

FIGS. 12A and 12B illustrate that the side load of the strip itself may be similar to the side load of the screen substrate. As shown in the example of FIGS. 12A and 12B, for a screen 1200 with an approximate thickness of 175 microns, and a mounting strip 1210 that is approximately 4.02 inches wide and approximately 0.032 inches thick, the mounting strip side load may be approximately 22.7 lbs/in$^2$ and the screen substrate side load may be approximately 30.1 lbs/in$^2$. Although the screen substrate and the mounting strip side loads do not exactly match, they are relatively close. Additionally, there is an approximate range around which the screen substrate and mounting strip side loads are sufficiently close which is within +/−30% of one another.

Continuing the discussion of FIGS. 12A and 12B, the screen side load may be calculated by dividing the screen spring force, N, by the thickness of the screen, t. The mounting strip side load may be calculated by dividing the mounting strip spring force by the area of the mounting strip or stated differently, by dividing the mounting strip spring force, M, by 2 times the thickness of the mounting strip, m, multiplied by the width of the mounting strip, W (mounting strip load=M/2 mW).

Figure 13:
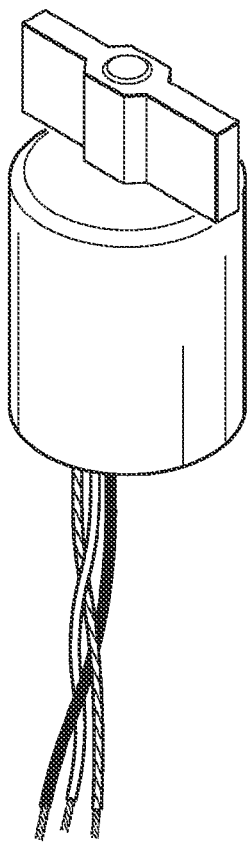
FIG. 13 is a schematic diagram illustrating a perspective view of one embodiment of a vibration transducer, in accordance with the present disclosure.
Figure 14:
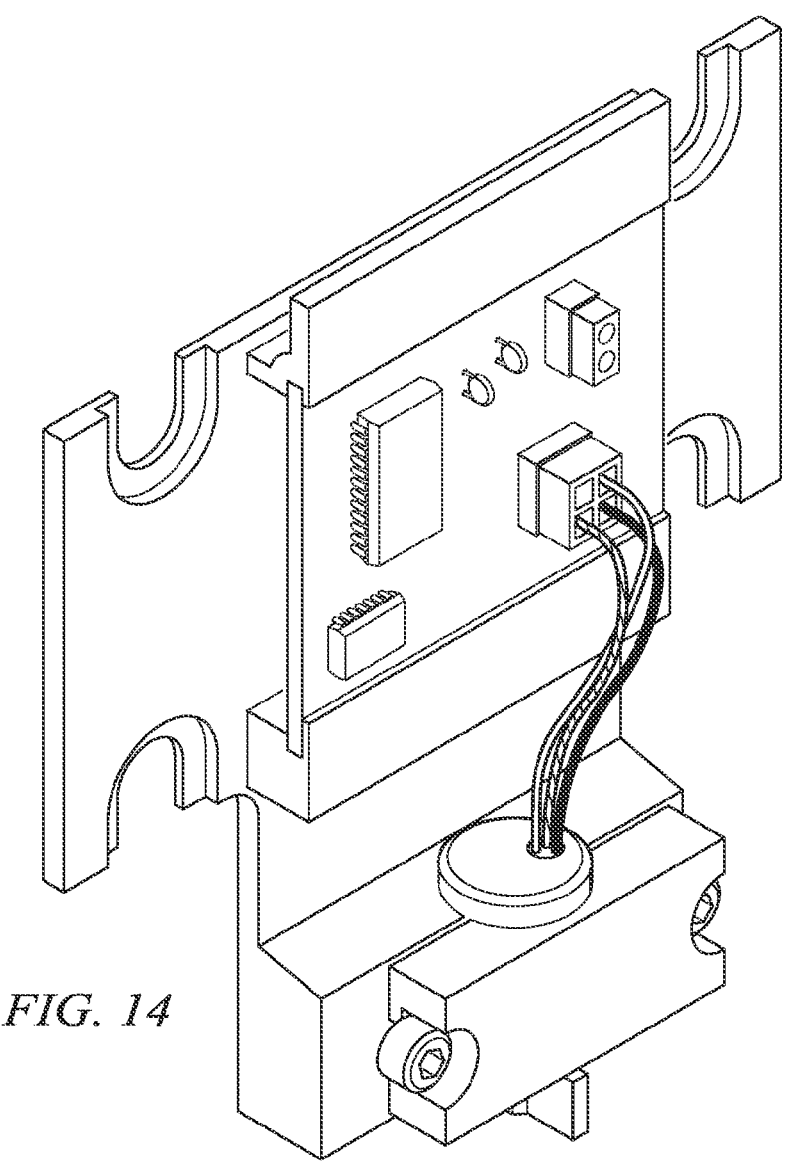
FIG. 14 is a schematic diagram illustrating a perspective view of one embodiment of a transducer mounting, in accordance with the present disclosure.

The higher modulus substrate and the higher modulus mounting strip may enable new ways to vibrate large screens as large screens may allow the vibration to travel or propagate further through the substrate. Because the vibrations may propagate further through the substrate, the speckle patterns and other optical artifacts may be averaged and harder to optically or human-perceptibly detect. In addition, higher frequencies can be used to excite the screen since they may effectively propagate in these screens. Frequencies in the approximate range of 50 to 500 Hz can be used, with preferred frequencies in the approximate range of 60 to 300 Hz. These frequencies may induce motion in the screen that may be harder to visually perceive by a human and that may better average the speckle patterns and therefore may be more effective against speckle. A key aspect is that the transducer may not have to be attached to or be in contact with the screen upon which the image is displayed. FIG. 13 is a schematic diagram illustrating one embodiment of a vibration transducer and FIG. 14 is a schematic diagram illustrating one embodiment of a transducer mounting. The vibration can travel far enough that the transducers can be attached in various patterns or spacing around the edges of the screen. In one embodiment, the transducer may attach directly to the mounting strip on the top and bottom of the screen. This mounting strip may be a very effective place to mount the transducer and may help increase the range that the vibrations travel in or through the screen as generally discussed in commonly-owned U.S. Provisional Patent Application No. 61/832,047, which is herein incorporated by reference in its entirety. The transducers can be mounted by using screws and plates that clamp the mounting strip as illustrated in FIG. 14 and may hold the vibration device to the screen. In addition, the transducers can be mounted on the strip on the front or back side of the screen. Adhesives can also be used to mount transducers. Another alternative is to have the transducers mounted to the metal frame of the screen and in contact with the mounting strip. The transducers can be mounted directly to the high modulus screen material itself and still be effective. However, attachment to the mounting strip typically improves vibration/speckle reduction performance.

Typically, the spacing between the transducers can be from approximately 4 to 40 feet apart on the mounting strip. Because the mounting strip is mechanically more robust, a heavy transducer and/or more forceful transducers can be used. The mounting strip also helps to more uniformly couple the vibration to the screen in a plane rather than as a point contact. Furthermore, vibrating the screen by using at least one transducer located proximate to the screen substrate may result in less than an approximately ten percent light intensity variation as visible to the eye.

Mechanical vibration devices such as off-axis or unbalanced motors can be used, flexures or regular motors can be used, either linear motion or rotary, such as voice coils as well as piezo-electric transducers or other types of vibration devices, individually, or in any combination thereof.

Table 1 below illustrates different screen substrates and the respective measured modulus. The screen substrates were measured using an Instron measurement device. The table shows the difference in modulus between PC screens (around 2000 MPa) and PVC screen modulus (around 50 MPa). The reduction in speckle can be quantified by a measurement of speckle contrast which is defined as the standard deviation of pixel intensity divided by the mean pixel intensity. Speckle contrasts of less than 5% are usually considered not visible or at the equivalent level as a lamp. With a single frequency, green laser speckle was measured in the range of 40 to 50% contrast off of the polarizing preserving screens. Vibration can reduce this number by factors of approximately 2 to 5 times. The far right column shows that with a given single vibration source attached to the mounting strip the PC based screen vibration significantly reduced speckle over nearly the entire screen used (around 20 ft), while the PVC based screen speckle reduction area was close to 1 to 2 ft radius. As noted in the header of the far right hand column a Precision Microdrive—Model 912-101 was used for the different measurements recorded in the table.

TABLE 1

| Screen Type | Modulus (MPa) | Modulus Ratio | PM 912 to 101 reduction area (0.1 nm source) |
|---|---|---|---|
| Engineered Screen Unperforated | 2,280 sd 54 | 1 | Full 22' × 10' screen |
| Silver Screens Perforated | 40 to 60 | 0.017 | around 1 foot |

As may be used herein, the terms "substantially" and "approximately" provide an industry-accepted tolerance for its corresponding term and/or relativity between items. Such an industry-accepted tolerance ranges from approximately zero percent to ten percent and corresponds to, but is not limited to, component values, angles, et cetera. Such relativity between items ranges between approximately zero percent to ten percent.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system using a projection screen.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation. While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method for managing strain primarily induced by a non-uniform load on a screen, comprising:
    using a high-elastic modulus substrate for the screen; and
    fastening a stiffening strip proximate to at least two edges of the high-elastic modulus substrate, wherein the stiffening strip substantially distributes the load on the screen; and
    attaching at least one mechanical vibration device proximate to the stiffening strip.

2. The method for managing strain primarily induced by a non-uniform load on a screen of claim 1, wherein the at least one mechanical vibration device is a transducer.

3. The method for managing strain primarily induced by a non-uniform load on a screen of claim 2, further comprising vibrating the screen using the at least one transducer so that less than an approximately ten percent light intensity variation results.

4. The method for managing strain primarily induced by a non-uniform load on a screen of claim 3, wherein the frequency range of the at least one transducer is approximately between 2 Hz to 500 Hz.

5. A projection screen, wherein the projection screen is operable to be mounted under a non-uniform load, comprising:
    a high-elastic modulus substrate; and
    a stiffening strip proximate to at least two edges of the high-elastic modulus substrate, wherein the stiffening strip results in a substantially uniform optical appearance of the projection screen; wherein the stiffening strip is attached to both the front surface and the back surface of the high-elastic modulus substrate to place the high-elastic modulus substrate under an approximately neutral mechanical load when the projection screen is rolled; and at least one vibration device located proximate to the stiffening strip.

6. The projection screen of claim 5, wherein the high-elastic modulus substrate is one of a polycarbonate substrate (PC) or a Polyethylene terephthalate (PET) substrate.

7. The projection screen of claim 5, wherein the stiffening strip is located at least at the top and bottom of the projection screen.

8. The projection screen of claim 5, wherein the stiffening strip and the high-elastic modulus substrate of the projection screen are the same material.

9. The projection screen of claim 5, wherein a non-uniform load is induced on the projection screen using spring connection points to generate localized loads.

10. The projection screen of claim 5, wherein the coefficient of thermal expansion of the stiffening strip is substantially the same as the high-elastic modulus substrate.

11. The projection screen of claim 5, wherein the stiffening strip is attached to the high-elastic modulus substrate surface using one of a pressure sensitive adhesive or an ultraviolet (UV) cured glue.

12. The projection screen of claim 5, wherein the at least one vibration device is a transducer.

13. The projection screen of claim 12, wherein the at least one transducer is operable to vibrate the high-elastic modulus substrate while maintaining less than approximately ten percent intensity variation across the projection screen.

14. A projection screen, comprising:
a high-elastic modulus substrate; and
at least one vibration device proximate to the high-elastic modulus substrate, wherein the at least one vibration device, wherein the at least one vibration device is a transducer and is operable to vibrate the high-elastic modulus substrate while maintaining less than approximately ten percent light intensity variation across the screen; and
a mounting strip proximate to at least two edges of the projection screen.

15. The projection screen of claim 14, wherein the mounting strip further comprises a high-elastic modulus material.

16. The projection screen of claim 15, wherein the mounting strip and the high elastic-modulus substrate of the screen are the same material.

17. The projection screen of claim 14, wherein the at least one vibration device is mounted to the mounting strip in at least one location.

18. The projection screen of claim 14, wherein the vibration generated by the at least one vibration device is sufficient to reduce the speckle contrast to less than approximately 15 percent speckle contrast.

* * * * *